Jan. 26, 1971 J. S. MATHIAS ET AL 3,558,306

ELECTROLESSLY DEPOSITED MAGNETIC COBALT ALLOYS

Original Filed March 9, 1966

INVENTORS
JOSEPH S. MATHIAS
JOSEPH J. McGEE

BY

*Sheldon Kapustka*

ATTORNEY 3,558,306
Patented Jan. 26, 1971

3,558,306

ELECTROLESSLY DEPOSITED MAGNETIC COBALT ALLOYS

Joseph S. Mathias, Riverton, N.J., and Joseph J. McGee, Colwyn, Pa., assignors to Sperry Rand Corporation, New York, N.Y., a corporation of Delaware Original application Mar. 9, 1966, Ser. No. 532,945, now Patent No. 3,416,932, dated Dec. 17, 1968. Divided and this application Mar. 29, 1968, Ser. No. 717,215
Int. Cl. C22b *23/04;* C22c *19/00;* C22d *1/14*
U.S. Cl. 75—170 4 Claims

ABSTRACT OF THE DISCLOSURE

An electroless plating solution useful for the electroless deposition of a magnetic cobalt alloy comprises an aqueous solution containing cobalt ions, such as may be provided by cobalt sulfate, a reducing agent, such as may be provided by sodium hypophoshite, a pH control agent, such as Rochelle Salt, together with an amount of aluminum sulfate $Al_2(SO_4)_3 \cdot 18H_2O$ or potassium titanium oxalate $K_2TiO(C_2O_4)_2 \cdot 2H_2O$ dissolved in said solution in an amount in the range 5–100 grams per liter and 4–100 grams per liter, respectively.

This invention is a division of application Ser. No. 532,945 filed Mar. 9, 1966, now U.S. Pat. 3,416,932, issued Dec. 17, 1968, and relates to magnetic alloys. In a particular embodiment this invention relates to magnetic alloys having a high coercive force. In another embodiment this invention relates to plating compositions useful for the electroless deposition of a magnetic alloy and to a method of preparing or depositing magnetic alloys by electroless deposition.

It is an object of this invention to provide new magnetic alloys.

It is another object of this invention to provide new magnetic alloys having a high coercive force.

Still another object of this invention is to provide novel plating solutions useful for the electroless deposition of a magnetic alloy.

Yet another object of this invention is to provide a method for the electroless deposition of magnetic alloys having a high coercive force.

Figure 2:
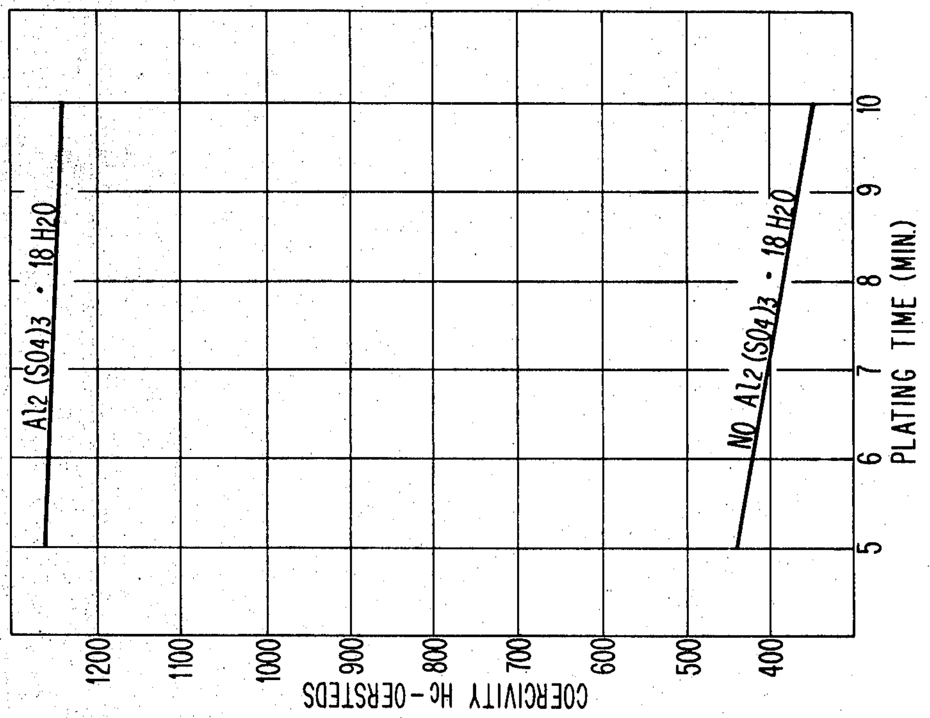
Figure 1:
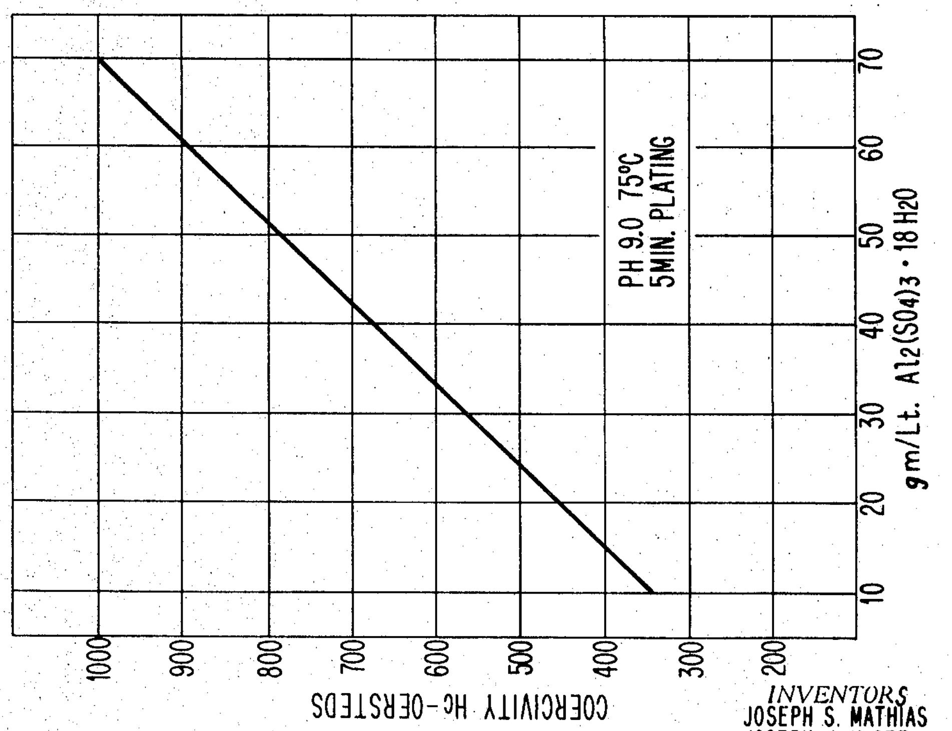

How these and other objects of this invention are achieved will become apparent in the light of the accompanying disclosure made with reference to the accompanying drawings wherein:

FIG. 1 graphically illustrates the effect of the composition of an electroless plating solution in accordance with this invention upon the coercive force of the resulting electrolessly deposited magnetic alloy; and wherein FIG. 2 graphically illustrates the effect of the plating solution composition and plating time with respect to the coercivity of the resulting electrolessly deposited magnetic alloy.

In accordance with at least one embodiment of this invention at least one of the foregoing objects will be achieved.

In accordance with this invention there are provided new magnetic alloys, particularly magnetic alloys exhibiting a high coercive force. The new magnetic alloys in accordance with this invention comprise a magnetic metallic element or metal, such as nickel, cobalt and iron, a non-magnetic, non-metallic element, such as phosphorus and sulfur and a non-magnetic, metallic material, such as an aluminum-containing material and titanium-containing material. Generally, the magnetic alloys in accordance with this invention comprise a major amount of a magnetic metallic element or metal, or mixtures thereof, and minor amounts of the non-magnetic, non-metallic element and the non-magnetic, metallic material.

Exemplary of the compositions of the new magnetic alloys in accordance with this invention are magnetic alloys comprising at least 90% cobalt, not more than about 5% phosphorus, such as between .40% and 4.0% by weight phosphorus, the remainder comprising a non-magnetic, metallic component, such as aluminum or titanium in element form and/or in oxide form. In magnetic alloys in accordance with this invention the magnetic, metallic cobalt may be replaced in whole or in part by iron and nickel or mixtures thereof. Generally, the non-magnetic element phosphorus may be replaced in whole or in part by another non-magnetic, non-metallic element, such as sulfur.

Further, although the non-magnetic, metallic element or metallic material is described hereinabove as comprising aluminum-containing material and/or titanium-containing material, the alloys in accordance with this invention are prepared under conditions which could tend to electrolessly deposit the non-magnetic, metallic component of the alloy, e.g. the aluminum and/or titanium-containing component, in the form of the corresponding oxide, such as alumina $Al_2O_3$ and titania $TiO_2$. Accordingly, the non-magnetic, metal-containing component of the alloys in accordance with this invention may be present in the form of the metallic element itself or its corresponding oxide or mixtures thereof.

Other magnetic alloys in accordance with this invention, as indicated hereinabove, would include magnetic alloys comprising at least about 90% by weight nickel, not more than about 5% phosphorus, the remainder being comprised of the non-magnetic metallic component.

Specific alloy compositions in accordance with this invention include a magnetic alloy exhibiting a high coercive force and consisting essentially of 97.5% by weight cobalt, .9% by weight phosphorus and 1.6% by weight aluminum and/or aluminum oxide, also a magnetic alloy consisting essentially of 96.1% by weight cobalt, 3.4% by weight phosphorus and 0.5% by weight aluminum and/or aluminum oxide, and also a magnetic alloy consisting essentially of 99.4% by weight cobalt, .4% by weight phosphorus and .2% by weight aluminum and/or aluminum oxide.

A characterizing property of the magnetic alloys prepared in accordance with this invention is the high coercive force exhibited by such alloys, particularly as compared with the coercive force or coercivity exhibited by other magnetic alloys, such as other magnetic alloys prepared by electroless deposition.

In accordance wih a presently preferred embodiment the magnetic alloys of this invention are prepared by electroless deposition upon any suitable or conventional substrate, such as presensitized plastic tape, e.g. Mylar tape, The electroless plating solutions useful in accordance with this invention are aqueous alkaline solutions containing dissolved therein a water soluble salt of the magnetic metallic element or metal, such as a water soluble salt of cobalt, nickel and iron, or mixtures of such salts. Cobalt sulfate, such as $CoSO_4 \cdot 7H_2O$, has been found to be suitable in the preparation of electroless plating solutions for the electroless deposition of magnetic cobalt-containing alloys in accordance with this invention.

Further, a water soluble hypophosphite, particularly sodium hypophosphite $NaH_2PO_2 \cdot H_2O$, has been found to be satisfactory in the preparation of electroless plating solutions for the deposition of phosphorus-containing magnetic alloys in accordance with this invention.

Also, a water soluble aluminum salt, such as aluminum sulfate $Al_2(SO_4)_3\cdot 18H_2O$, has been found to be suitable for the preparation of electroless plating solutions useful for the deposition of aluminum and/or aluminum oxide containing magnetic alloys in accordance with this invention.

In addition to the water soluble salt of a magnetic element or metal and the water soluble salt of the non-magnetic, metallic element or metal and the water soluble phosphorus compound, such as sodium hypophosphite, the electroless plating solutions in accordance with this invention include the usual additives, complexing agents, buffers, pH control agents and the like, such as Rochelle Salt $KNaC_4H_4O_6\cdot 4H_2O$. Other reducing agents in place of the above hypophosphite, and suitable complexing agents in place of Rochelle Salt, may be employed in the preparation of electroless plating solutions in accordance with this invention.

Although emphasis has been placed in the disclosure of this invention on the use of electroless plating solutions for the production and deposition of the high coercive force magnetic alloys, other techniques for the production and deposition of such alloys are suitable and may be employed. These other techniques include metallurgical and/or electroplating techniques and the like.

Illustrative of the practices of this invention an aqueous alkaline electroless plating solution was prepared having the composition:

| Component: | Amount, grams per liter |
|---|---|
| Cobalt sulfate $CoSO_4\cdot 7H_2O$ | 35 |
| Rochelle salt $KNaC_4H_4O_6\cdot 4H_2O$ | 150 |
| Sodium hypophosphite $NaH_2PO_2\cdot H_2O$ | 20 |

The pH of the resulting solution was adjusted by the addition of an alkaline alkali metal compound, such as an alkali metal hydroxide, e.g. NaOH, to the alkaline range, such as a pH in the range about 8.0 to about 10.

To the above aqueous solution an aluminum salt, aluminum sulfate $Al_2(SO_4)_3\cdot 18H_2O$, was added incrementally in amounts of 5 grams per liter. Accompanying FIG. 1 shows the influence of the amount or concentration of the aluminum sulfate in the plating solution upon the coercivity of the magnetic alloys electrolessly deposited from the above-described electroless plating solution when maintained at a pH of about 9.0 and at a temperature of about 75° C. In these tests suitable substrate material for the electroless deposition of the magnetic alloy thereon was exposed to the various test electroless plating solutions for a period of five minutes. Following the electroless plating operation the test electrolessly deposited magnetic alloys were then examined for coercivity. It is to be noted, as indicated in accompanying FIG. 1, that increased concentration of aluminum sulfate in the electroless plating solution yielded magnetic alloys having increased or higher coercivity.

It was observed during these tests that the pH of the electroless plating solution appeared to influence the coercivity of the electrolessly deposited magnetic alloys. For example, at a relatively low pH in the alkaline range, about a pH 8.5, the resulting electrolessly deposited magnetic alloy exhibited a coercivity of 625 oersteds. On the other hand, when the electroless plating solution in accordance with this invention was maintained at relatively high pH in the alkaline range, a pH of about 9.3, the coercivity of the resulting electrolessly deposited magnetic alloy was about 1300 oersteds.

In the preparation of electroless plating solutions in accordance with this invention the water soluble salt of the magnetic metallic element or metal, such as cobalt sulfate, may be present in the electroless plating solution in an amount in the range 5–100 grams per liter. The additive salt, Rochelle Salt, may be present in the electroless plating solution in an amount in the range 75–300 grams per liter, more or less. The water soluble phosphorus-containing reducing compound, sodium hypophosphite, may be present in an amount in the range 5–30 grams per liter. Further, the water soluble salt of the non-magnetic, metallic element or metal may be present in the electroless plating solution in an amount in the range 5–100 grams per liter, more or less.

In the electroless deposition of titanium-containing magnetic alloys in accordance with this invention substantially the same, above-described basic electroless plating solution is employed save in place of aluminum sulfate a water soluble titanium compound, such as potassium titanium oxalate $K_2TiO(C_2O_4)_2.2H_2O$, is employed, usually in an amount in the range from about 4 grams per liter or higher, such as up to about 50–100 grams per liter, more or less.

Further illustrative of the practices of this invention, there was prepared an aqueous alkaline electroless plating solution having the composition:

| | Grams per liter |
|---|---|
| Cobalt sulfate $CoSO_4.7H_2O$ | 35 |
| Rochelle salt $KNaC_4H_4O_6.4H_2O$ | 150 |
| Sodium hypophosphite $NaH_2PO_2.H_2O$ | 20 |
| Aluminum sulfate $Al_2(SO_4)_3.18H_2O$ | 50 |

This electroless plating solution was adjusted by the addition of sodium hydroxide NaOH to a pH of about 9.3. Test panels of a suitable substrate were immersed in the test plating solutions for varying periods of time for the electroless deposition of the magnetic alloy thereon.

FIG. 2 illustrates the influence of plating time upon the coercivity of the resulting electrolessly deposited magnetic alloy. As indicated in FIG. 2 a longer plating time to permit the build-up of thicker or heavier electroless deposits of the magnetic alloy exhibited substantially no important influence upon coercivity of the electrolessly deposited magnetic alloys. The coercivity of the electrolessly deposited magnetic alloys remained substantially unchanged whether the alloy was produced by electroless deposition over a period of five or ten minutes. On the other hand, as illustrated in FIG. 2, the electroless magnetic deposits obtained from an electroless plating solution not in accordance with this invention, i.e. not including a water soluble aluminum or titanium salt, exhibited not only a sharply reduced coercivity but also exhibited a marked decline in coercivity the longer the time required for the electroless deposition.

The electroless deposition of magnetic alloys in accordance with this invention may be carried out at any suitable temperature, such as a temperature in the range from about room temperature, e.g. about 15° C. up to about 75° C. and higher depending upon the substrate material upon which the magnetic alloy is to be deposited, the sensitivity of the plating solution, the immersion time desired, the plating solution composition and the like.

As will be apparent to those skilled in the art in the light of the foregoing disclosure many modifications, alterations and substitutions are possible in the practice of this invention without departing from the spirit or scope thereof.

The embodiments of the invention in which an exclusive property or privilege is claimed are defined as follows:

1. An electrolessly deposited magnetic alloy consisting essentially of at least about 90% by weight cobalt, about 0.4% to less than about 5% by weight phosphorus, the remainder comprising aluminum-containing material.

2. A magnetic alloy in accordance with claim 1 consisting essentially of and analyzing about 97.5% cobalt, about 0.9% phosphorus and about 1.6% aluminum-containing material.

3. A magnetic alloy in accordance with claim 1 consisting essentially of and analyzing about 96.1% cobalt, about 3.4% phosphorus and about 0.5% aluminum-containing material.

4. A magnetic alloy in accordance with claim 1 consisting essentially of and analyzing about 99.4% cobalt, about 0.4% phosphorus and about 0.2% aluminum.

References Cited

UNITED STATES PATENTS

| | | | |
|---|---|---|---|
| 859,608 | 7/1907 | Marsh | 75—170 |
| 1,454,065 | 5/1923 | Myers | 75—170X |
| 1,757,714 | 5/1930 | Hogaboom | 75—170 |
| 1,910,309 | 5/1933 | Smith | 75—170X |
| 2,050,387 | 8/1936 | Scott | 75—135 |
| 3,203,838 | 8/1965 | Masumoto et al. | 148—103 |
| 3,211,592 | 10/1965 | Masumoto et al. | 148—101X |

L. DEWAYNE RUTLEDGE, Primary Examiner

J. E. LEGRU, Assistant Examiner

U.S. Cl. X.R.

75—123, 124, 171; 148—31.5, 31.57